United States Patent
Williams, Jr.

(10) Patent No.: US 12,417,268 B1
(45) Date of Patent: Sep. 16, 2025

(54) BEHAVIORAL AUTHORSHIP VERIFICATION SYSTEM AND METHOD

(71) Applicant: Alvin Williams, Jr., Philadelphia, PA (US)

(72) Inventor: Alvin Williams, Jr., Philadelphia, PA (US)

(*) Notice: Subject to any disclaimer, the term of this patent is extended or adjusted under 35 U.S.C. 154(b) by 0 days.

(21) Appl. No.: 19/222,997

(22) Filed: May 29, 2025

(51) Int. Cl.
G06F 21/00 (2013.01)
G06F 21/31 (2013.01)
G06F 21/32 (2013.01)

(52) U.S. Cl.
CPC ............ *G06F 21/316* (2013.01); *G06F 21/32* (2013.01)

(58) Field of Classification Search
CPC ................................ G06F 21/316; G06F 21/32
See application file for complete search history.

(56) References Cited

U.S. PATENT DOCUMENTS

| | | | |
|---|---|---|---|
| 2018/0061254 A1* | 3/2018 | Amigud | G09B 5/00 |
| 2019/0205887 A1* | 7/2019 | Kimmel | G06F 21/6245 |
| 2024/0248971 A1* | 7/2024 | Rao | G06F 21/34 |
| 2024/0371510 A1* | 11/2024 | Aman | G16H 40/63 |
| 2024/0411528 A1* | 12/2024 | Ziolkowski | G06F 8/72 |
| 2025/0141682 A1* | 5/2025 | Hutchinson | G06F 21/32 |

* cited by examiner

*Primary Examiner* — William A Corum, Jr.
(74) *Attorney, Agent, or Firm* — Sam Pierce

(57) ABSTRACT

A behavioral authorship verification system captures and analyzes multi-modal behavioral patterns during content creation to authenticate human authorship. The system comprises a processor executing behavioral analysis modules that generate comprehensive behavioral fingerprints distinguishing genuine human authors from AI-generated content and impostor authorship. A sentence progression mapping module detects sentence boundaries and captures intermediate composition states including additions, deletions, and modifications. A multi-modal input analysis module monitors keystroke dynamics including flight time and dwell time while detecting paste events and input method transitions. A behavioral pattern recognition engine generates user-specific baselines from historical sessions and computes deviation scores using statistical distance metrics. An anomaly correlation module aggregates behavioral deviation signals using weighted fusion algorithms to detect sophisticated mimicry attempts. An authorship scoring engine synthesizes outputs into unified confidence scores while maintaining temporal authorship chains. The system enables real-time authorship verification during content creation rather than post-hoc analysis.

28 Claims, 3 Drawing Sheets

BEHAVIORAL AUTHORSHIP VERIFICATION SYSTEM AND METHOD

BACKGROUND OF THE INVENTION

Field of Invention

The various aspects discussed herein relate to systems and methods for behavioral authorship verification.

Description of Related Art

Content authorship verification systems are utilized across educational, legal, journalistic, and corporate environments to establish document authenticity. Existing systems rely on stylometric analysis and statistical similarity comparisons to detect plagiarism or verify authorship. However, these conventional approaches fail to capture the behavioral process through which content is created. Current platforms may monitor certain discrete events during content creation but do not analyze these events as comprehensive behavioral indicators of authorship authenticity. Furthermore, existing solutions cannot adequately distinguish between content generated by sophisticated artificial intelligence systems, human-imitating ghostwriters, and authentic human authors. The inability to verify true authorship through behavioral analysis presents significant challenges in academic integrity, legal authentication, and content verification contexts.

Accordingly, there is a need in the art for an improved authorship verification system that captures and analyzes multi-modal behavioral signals during content creation to establish trustable behavioral fingerprints.

BRIEF SUMMARY OF THE INVENTION

This summary is provided to introduce a selection of concepts, in a simplified format, that are further described in the detailed description of the invention. This summary is neither intended to identify key or essential inventive concepts of the invention nor is it intended for determining the scope of the invention.

In one aspect, the present invention provides a behavioral authorship verification system that captures and analyzes multi-modal behavioral patterns during content creation to establish authentic human authorship. The system comprises a processor configured to execute multiple behavioral analysis modules that collectively generate comprehensive behavioral fingerprints distinguishing genuine human authors from AI-generated content, impostor authorship, and hybrid human-AI collaborations.

The behavioral authorship verification system includes a sentence progression mapping module that detects sentence boundaries and captures intermediate sentence states during composition, including additions, deletions, and modifications. The module generates sentence evolution vectors representing temporal progression patterns and extracts behavioral features including revision frequency, edit distances, and pause durations between modifications. A multi-modal input analysis module monitors keystroke dynamics including flight time between consecutive keystrokes and dwell time on individual keys, while detecting paste events and analyzing surrounding behavioral context to identify input method transitions.

Advantageously, the system incorporates a behavioral pattern recognition engine that generates user-specific behavioral baselines from historical authorship sessions and computes deviation scores between current behavioral patterns and established baselines using statistical distance metrics. This enables detection of anomalous patterns indicative of non-human or impostor authorship through continuous behavioral monitoring rather than post-hoc content analysis.

The present invention solves the problems associated with conventional authorship verification by implementing an anomaly correlation module that aggregates multiple behavioral deviation signals using weighted fusion algorithms. The module applies compound anomaly detection wherein combinations of minor deviations trigger escalated risk scores, thereby catching sophisticated attempts to mimic human behavior that might evade single-metric detection systems.

In operation, an authorship scoring engine synthesizes outputs from the behavioral analysis modules into a unified authorship confidence score while maintaining temporal authorship chains linking behavioral patterns across document sections. The system provides real-time authorship verification decisions based on configurable confidence thresholds, enabling immediate detection of authorship anomalies during content creation rather than after completion.

The behavioral authorship verification system may further comprise visual authorship verification capabilities including biometric sensors that capture gaze behavior parameters to generate human witnessing signatures. Additional embodiments include AI mimicry detection modules that identify GPT-style phrasing patterns and detect hybrid authorship zones through intra-document behavioral fingerprint analysis. The system may also implement privacy preservation mechanisms using differential privacy and secure multi-party computation protocols, ensuring user behavioral data remains protected while maintaining verification accuracy.

The present invention improves upon the prior art by establishing forensic-grade chain-of-custody for behavioral events through cryptographic hashing and immutable audit logs. Cross-platform behavioral normalization enables consistent authorship verification across heterogeneous devices, while cognitive rhythm models distinguish natural human hesitation from programmatic delays. The multi-tier fusion architecture with attention mechanisms enables sophisticated pattern recognition that adapts to evolving authorship behaviors over time.

The behavioral authorship verification system has the advantage of providing legally admissible evidence for authorship disputes while maintaining user privacy and control over behavioral data. The system's ability to detect re-authorship attempts, ghostwriting, and AI-assisted content generation addresses critical needs in academic integrity, legal documentation, intellectual property protection, and content authenticity verification across industries.

Additional features and advantages of the invention will be set forth in the description which follows. These and other features of the present invention will become more fully apparent from the following description, or may be learned by the practice of the invention as set forth hereinafter.

The various exemplary embodiments of the present invention, which will become more apparent as the description proceeds, are described in the following detailed description of the comprehensive behavioral authorship verification system 100 deployed across a distributed computing architecture for real-time detection of human authorship patterns and identification of AI-generated or impostor content. The system, information and user flow for behavioral authorship verification depicting the operational sequence from user interaction through real-time verification decision output.

DETAILED DESCRIPTION

Figure 1A:
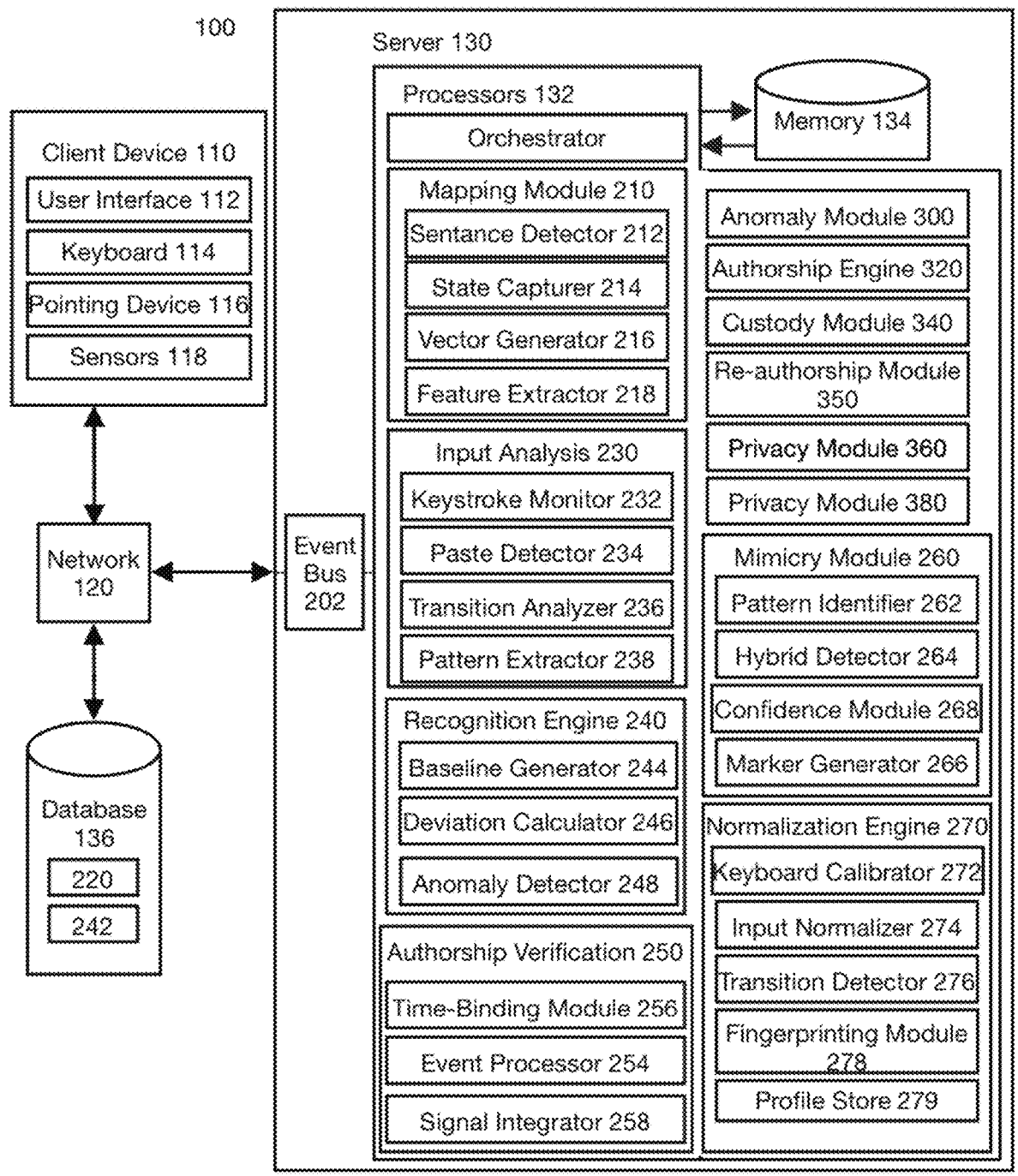
FIG. 1A illustrates a comprehensive behavioral authorship verification system 100 deployed across a distributed computing architecture for real-time detection of human authorship patterns and identification of AI-generated or impostor content.
Figure 1B:
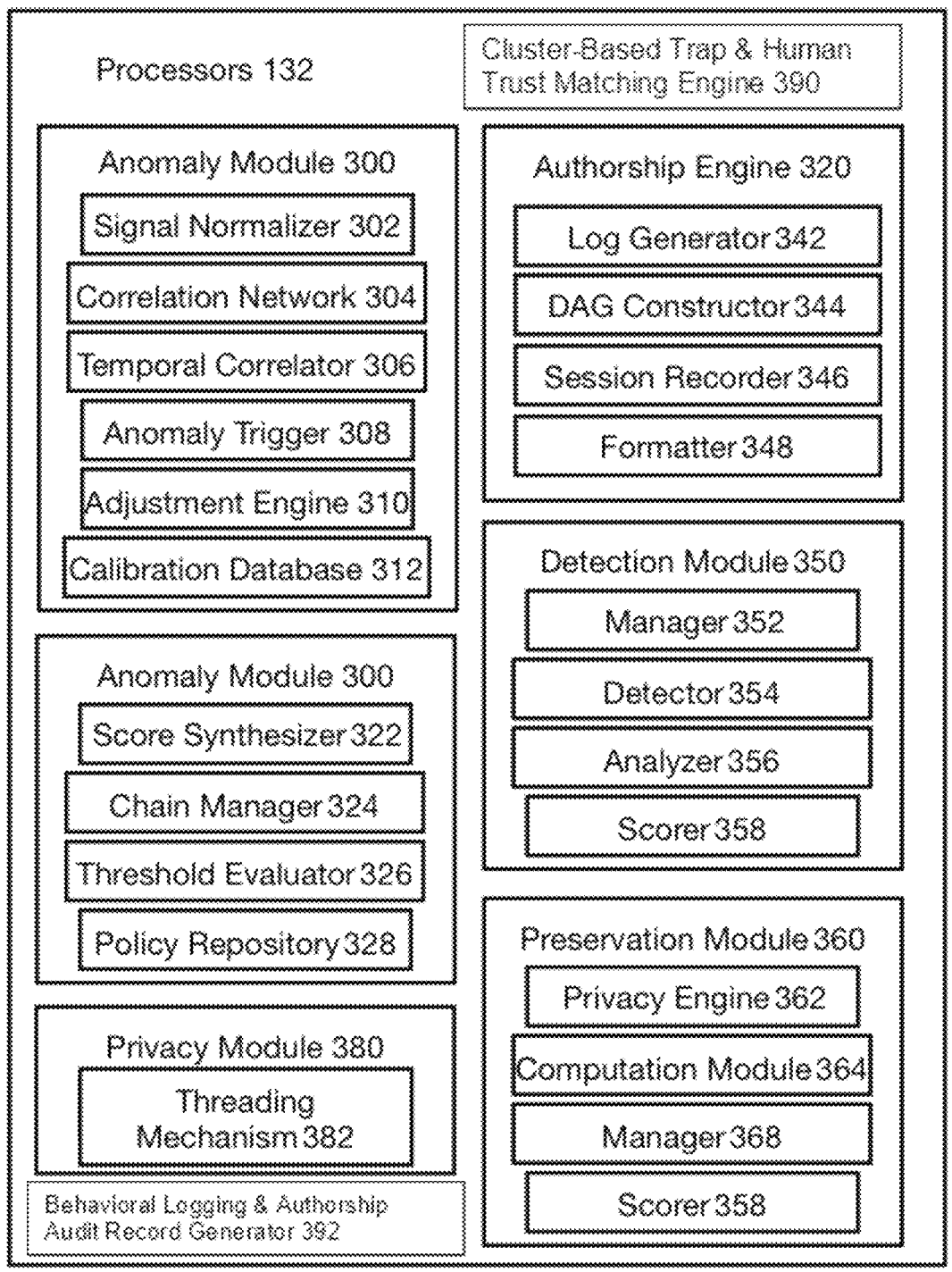
FIG. 1B illustrates an expanded view of modules within FIG. 1A, illustrating their internal components and interconnections.
Figure 2:
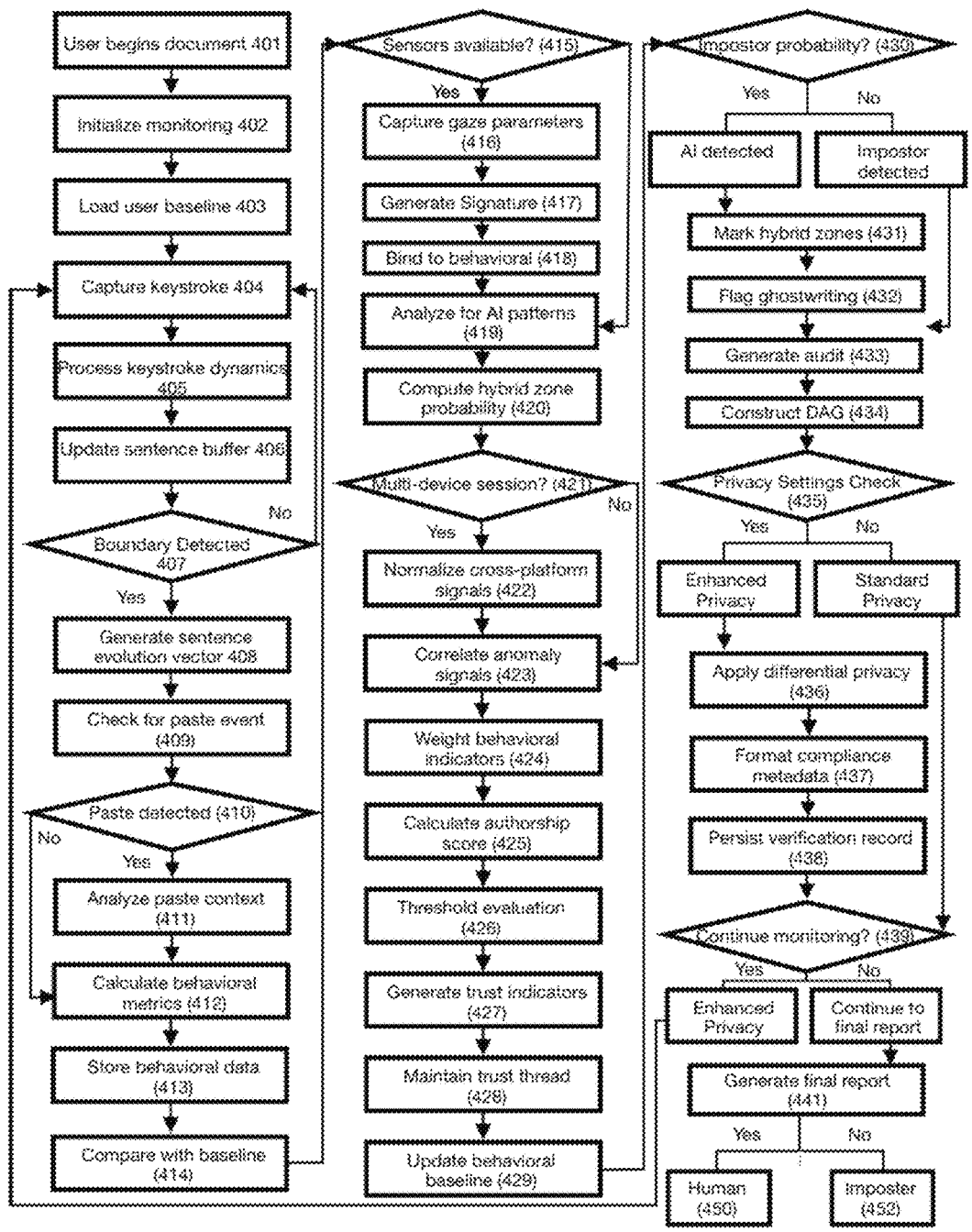
FIG. 2 is a flowchart illustrating the system, information and user flow for behavioral authorship verification depicting the operational sequence from user interaction through real-time verification decision output.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

The present application describes a comprehensive behavioral authorship verification system 100 deployed across a distributed computing architecture for real-time detection of human authorship patterns and identification of AI-generated or impostor content. A client device 110 hosts a user interface 112 through which authors interact with document creation tools. The client device 110 incorporates input peripherals including a keyboard 114, pointing device 116, and optional biometric sensors 118 for capturing gaze behavior parameters. The client device 110 communicates via a secure network 120 implementing TLS 1.3 encryption protocols to a server infrastructure 130. The server infrastructure 130 comprises one or more processors 132 executing machine-readable instructions stored in a memory 134. A database system 136 maintains persistent storage of behavioral templates, authorship baselines, and forensic metadata using a combination of relational tables for structured data and document stores for temporal event sequences.

A behavioral analysis orchestrator 200 coordinates execution of a plurality of behavioral analysis modules 210-280 on the processor 132. Each module generates timestamped behavioral events transmitted via an event bus 202 to downstream processing components. A sentence progression mapping module 210 interfaces with the client device 110 to receive real-time keystroke events. The module comprises a sentence boundary detector 212 implementing natural language processing algorithms to identify punctuation marks and linguistic markers delimiting sentence structures, an intermediate state capturer 214 maintaining a rolling buffer of sentence evolution states including character-level additions, deletions, and modifications with millisecond-precision timestamps, a sentence evolution vector generator 216 transforming temporal progression patterns into multi-dimensional feature vectors capturing revision trajectories, and a behavioral feature extractor 218 computing revision frequency metrics, edit distance calculations using Levenshtein algorithms, and pause duration histograms between modification events. The sentence progression mapping module 210 outputs structured behavioral data to a behavioral data store 220 within the database system 136.

A multi-modal input analysis module 230 operates in parallel with the sentence progression mapping module 210 to monitor diverse input modalities. The multi-modal input analysis module 230 includes a keystroke dynamics monitor 232 that captures flight time measurements between consecutive keystrokes and dwell time distributions on individual keys using high-resolution system timers, a paste event detector 234 that intercepts clipboard operations and analyzes surrounding behavioral context including typing cadence disruptions pre- and post-paste events, an input method transition analyzer 236 that identifies modality switches between keyboard input, paste operations, voice dictation, and touch-based inputs, and a correction pattern extractor 238 that detects backspace sequences, multi-character deletions, and rewrite behaviors indicative of human cognitive processing.

A behavioral pattern recognition engine 240 retrieves historical authorship data from a baseline repository 242 within the database 136. The behavioral pattern recognition engine 240 comprises a baseline generator 244 that constructs user-specific behavioral profiles from authenticated historical sessions using statistical modeling techniques including Gaussian mixture models, a deviation score calculator 246 that computes distance metrics between current behavioral patterns and established baselines using Mahalanobis distance, cosine similarity, and dynamic time warping algorithms, and an anomaly detector 248 that applies threshold-based and machine learning classifiers to identify patterns deviating from human behavioral norms.

A visual authorship verification module 250 interfaces with biometric sensors 118 on the client device 110. The visual authorship verification module 250 includes a biometric data receiver 252 that captures gaze behavior parameters including eye movement trajectories sampled at 120 Hz, blink rate patterns, pupil dilation measurements via infrared sensors, and focus duration metrics. A visual event processor 254 correlates gaze timestamps with content creation events to generate human witnessing signatures proving physical presence during authorship. A time-binding module 256 creates cryptographic associations between visual verification events and corresponding sentence progression states using HMAC-SHA256 algorithms. A visual signal integrator 258 feeds processed biometric data to the authorship scoring engine for multi-modal verification.

An AI mimicry detection module 260 analyzes linguistic and behavioral patterns characteristic of large language models. The AI mimicry detection module 260 comprises a GPT-style pattern identifier 262 that maintains a library of sentence structure templates, transition phrase frequencies, and formatting regularities observed in AI-generated text, a hybrid zone detector 264 that implements sliding window analysis with overlapping segments of 100-500 tokens to compute intra-document behavioral fingerprint inconsistencies, a zone boundary marker generator 266 that outputs transition indicators between human-authored and AI-generated content sections with associated confidence scores, and a contextual confidence calculator 268 that adjusts detection sensitivity based on surrounding behavioral pattern strength.

A cross-platform behavioral normalization engine 270 ensures consistent verification across heterogeneous devices. The cross-platform behavioral normalization engine 270 includes a keyboard calibrator 272 that applies device-specific transfer functions to normalize keystroke dynamics across mechanical, membrane, and virtual keyboards, a touch input normalizer 274 that converts touch-based gestures and virtual keyboard interactions to keyboard-equivalent behavioral metrics, a device transition detector 276 that identifies mid-session device changes through behavioral drift analysis, and a device fingerprinting module 278 that maintains separate behavioral baselines for each registered device in a device profile store 279.

An anomaly correlation module 300 implements sophisticated signal fusion through a multi-tier architecture. A signal normalizer 302 applies z-score standardization to heterogeneous behavioral metrics. A neural correlation network 304 employs attention mechanisms to identify co-occurring anomaly patterns across behavioral dimensions. A temporal correlator 306 examines consistency across sliding time windows of 30-300 seconds. A compound anomaly trigger 308 activates when three or more minor deviations coincide. A weight adjustment engine 310 dynamically calibrates signal importance based on historical performance metrics stored in a calibration database 312.

An authorship scoring engine 320 synthesizes all behavioral signals through multiple components. A score synthesizer 322 combines outputs from modules 210-280 using a weighted ensemble approach. A temporal chain manager 324 maintains linkages between behavioral patterns across document sections using a directed acyclic graph structure. A confidence threshold evaluator 326 compares aggregate scores against configurable thresholds stored in a policy repository 328. A real-time decision generator 330 outputs binary verification decisions and confidence percentages to the user interface 112.

A chain-of-custody module 340 ensures forensic integrity of behavioral data. The chain-of-custody module 340 includes an audit log generator 342 that creates immutable records using SHA-256 hashing of behavioral event sequences, a DAG constructor 344 that builds directed acyclic graph structures linking behavioral states temporally, a session recorder 346 that generates replayable behavioral traces for post-hoc analysis, and a legal compliance formatter 348 that structures metadata according to Federal Rules of Evidence standards.

A re-authorship detection module 350 identifies document tampering through several mechanisms. A version template manager 352 maintains behavioral snapshots for each document section. A rewrite detector 354 applies dynamic time warping to compare current patterns against historical templates. A ghostwriting analyzer 356 computes statistical divergence between claimed author baselines and observations. A longitudinal scorer 358 tracks consistency across sessions spanning days to months.

A privacy preservation module 360 protects user behavioral data while maintaining verification efficacy. A differential privacy engine 362 adds calibrated Laplacian noise to behavioral metrics. A secure computation module 364 generates anonymized templates using homomorphic encryption. A granularity controller 366 implements user-specified retention policies from session-only to permanent storage. A data sovereignty manager 368 provides user interfaces for template deletion and correlation permissions.

A visual feedback generator 380 creates real-time authorship indicators displayed on the user interface 112, including color-coded confidence bars updated at sentence boundaries, trust level annotations ranging from "verified human" through "probable human" to "high AI probability", and behavioral anomaly highlights identifying specific suspicious patterns. A trust threading mechanism 382 maintains running behavioral consistency scores, propagating trust degradation forward when anomalies are detected and requiring behavioral re-establishment after trust scores drop below configured thresholds.

All behavioral events flow from the client device 110 through the network 120 to server-side processing modules. The event bus 202 implements a publish-subscribe architecture enabling real-time stream processing. Behavioral features extracted by modules 210-280 are persisted in the database 136 with appropriate indexing for rapid retrieval during verification operations. The system implements REST APIs 390 for third-party integration and a WebSocket interface 392 for real-time behavioral streaming. A load balancer 394 distributes processing across multiple server instances 130 to ensure sub-100 ms response times for authorship verification decisions. This architecture enables continuous, non-intrusive behavioral monitoring while maintaining privacy controls and generating forensic-grade evidence suitable for legal proceedings regarding document authenticity and human authorship verification.

The behavioral analysis orchestrator 200 implements a core scoring engine protection mechanism through the authorship scoring engine 320 which operates as a behavioral scoring engine configured to receive one or more behavioral inputs from the plurality of behavioral analysis modules 210-280 and generate a trust score indicative of authorship match confidence. The score synthesizer 322 within the authorship scoring engine 320 processes behavioral inputs independently of baseline comparison requirements, enabling the system to generate absolute trust scores based solely on observed behavioral patterns when no historical baseline exists in the baseline repository 242. In baseline-independent mode, the authorship scoring engine 320 analyzes behavioral signal consistency across temporal windows to identify human-characteristic patterns including natural typing rhythm variations, cognitive pause distributions, and organic correction sequences. When baselines are available from the baseline repository 242, the behavioral pattern recognition engine 240 enhances trust score accuracy through comparative analysis using the deviation score calculator 246, but such baseline comparison remains optional rather than mandatory for trust score generation.

The system 100 implements input flexibility and future-proofing through a modular behavioral signal architecture within the behavioral analysis orchestrator 200. The multi-modal input analysis module 230 processes stylometric inputs through the keystroke dynamics monitor 232 which captures typing cadence, rhythm variations, and pause patterns characteristic of individual writing styles. Voice inputs are processed through an optional voice analysis module (not shown) interfaced with the client device 110 to capture vocal biomarkers including pitch variations, speaking rate fluctuations, and phonetic emphasis patterns. Neural inputs are received through the biometric sensors 118 which may include electroencephalography (EEG) sensors, functional near-infrared spectroscopy (fNIRS) devices, or other brain-computer interface peripherals capable of detecting cognitive load variations during content creation. Gaze inputs are captured by the visual authorship verification module 250 through the biometric data receiver 252. Metadata inputs flow through the chain-of-custody module 340 which processes device fingerprints, session identifiers, and temporal markers. Paste behavior signals are detected by the paste event detector 234 within the multi-modal input analysis module 230. Real-time session signals are continuously captured through the WebSocket interface 392 enabling millisecond-precision behavioral event streaming. This extensible architecture permits integration of future behavioral signal types without structural modifications to the core scoring engine.

Neural input recognition capabilities are implemented through specialized processing pathways within the behavioral analysis orchestrator 200. When biometric sensors 118 include neural interface devices, the system captures neural signals derived from cognitive input systems including brain-computer interfaces, thought-to-text translators, and neural prosthetic devices. The visual authorship verification module 250 extends beyond visual signals to process neural event streams through the biometric data receiver 252, which implements adaptive filtering algorithms to extract behaviorally-relevant neural patterns from raw EEG or fNIRS data. The visual event processor 254 correlates neural signal fluctuations with content creation events, identifying cognitive effort signatures associated with sentence formulation, word selection deliberation, and creative ideation phases. The time-binding module 256 creates cryptographic linkages between neural activity bursts and corresponding text generation events, establishing tamper-evident chains proving cognitive engagement during authorship. Neural signals indicating heightened cognitive load during complex sentence construction or decreased activity during routine phrase generation provide additional behavioral dimensions for the authorship scoring engine 320 to synthesize into comprehensive trust scores.

The behavioral pattern recognition engine 240 implements baseline optionality through dual operational modes coordinated by the baseline generator 244. In baseline-available mode, the deviation score calculator 246 computes statistical distances between current behavioral observations and user-specific templates stored in the baseline repository 242, generating relative trust scores indicating consistency with historical patterns. In baseline-absent mode, the anomaly detector 248 shifts to absolute behavioral analysis, comparing observed patterns against population-wide human behavioral norms rather than individual baselines. The baseline generator 244 maintains a switch mechanism that automatically detects baseline availability and routes processing accordingly, ensuring the authorship scoring engine 320 receives valid trust scores regardless of baseline presence. This architecture enables immediate verification of first-time users while providing enhanced accuracy for users with established behavioral histories, supporting both anonymous verification scenarios and personalized authorship validation use cases.

The sentence progression mapping module 210 implements a comprehensive seven-layer stylometric analysis system through coordinated operation of its subcomponents. The sentence boundary detector 212 analyzes sentence variation by computing sentence length distributions, syntactic complexity metrics using parse tree depth analysis, and clause nesting patterns. The intermediate state capturer 214 measures vocabulary entropy through real-time tracking of word frequency distributions, hapax legomena ratios, and type-token ratios computed over sliding windows. The sentence evolution vector generator 216 detects phrase reuse by maintaining a rolling cache of n-gram sequences and identifying repetition patterns characteristic of human memory limitations versus AI-model tendencies toward excessive variation. The behavioral feature extractor 218 analyzes punctuation rhythm through inter-punctuation timing intervals, punctuation type sequences, and rhythmic patterns in comma, period, and semicolon usage. Passive voice presence is detected through linguistic analysis identifying past participle constructions and auxiliary verb patterns. Sentence progression patterns are mapped by the sentence evolution vector generator 216 which tracks how sentences evolve from initial fragments to completed thoughts, capturing the meandering paths characteristic of human composition. Structural consistency is evaluated through document-wide analysis of paragraph lengths, heading patterns, and organizational coherence metrics. These seven stylometric dimensions flow through the event bus 202 to the authorship scoring engine 320 for multi-dimensional trust score synthesis.

Human origin verification is implemented through a multi-layered validation architecture ensuring content was initiated and generated by a biological human. The behavioral analysis orchestrator 200 enforces human origin requirements by analyzing behavioral signal consistency across multiple physiological and cognitive dimensions that cannot be simultaneously faked by automated systems. The multi-modal input analysis module 230 verifies biological presence through the keystroke dynamics monitor 232 which detects micro-timing variations caused by neuromuscular control loops operating at 10-20 Hz frequencies characteristic of human motor control. The visual authorship verification module 250 confirms physical presence through the biometric data receiver 252 capturing involuntary eye movements, spontaneous blink patterns averaging 15-20 per minute, and saccadic movements during reading that follow predictable but individually-unique trajectories. The paste event detector 234 identifies behavioral disruptions surrounding non-human input methods, flagging sections where behavioral continuity breaks. The temporal correlator 306 within the anomaly correlation module 300 examines cross-modal consistency, ensuring keystroke dynamics align temporally with gaze patterns and neural signals when available. The authorship scoring engine 320 grants human origin verification only when behavioral signal consistency exceeds predetermined thresholds across at least three independent biological channels, preventing spoofing through any single faked signal while maintaining usability when some sensors are unavailable.

Metadata-based trust scoring is implemented through comprehensive signal collection and processing within the chain-of-custody module 340. The audit log generator 342 captures input duration metrics including total session length, active typing duration excluding idle periods exceeding 30 seconds, and temporal distribution patterns of activity bursts. Input method metadata tracked by the input method transition analyzer 236 includes keyboard type identification, touch screen interaction patterns, voice input activation timestamps, and paste operation sources. Session identifiers generated by the session recorder 346 maintain cryptographic continuity across authentication events, device switches, and network reconnections, enabling the system to track behavioral consistency across extended authorship sessions. Device fingerprinting performed by the device fingerprinting module 278 captures hardware characteristics including CPU timing variations, memory access patterns, and peripheral response latencies that collectively identify devices with high precision. These metadata signals flow to the authorship scoring engine 320 where the score synthesizer 322 incorporates them as behavioral trust factors, adjusting overall trust scores based on metadata consistency and anomaly patterns. Suspicious metadata patterns such as impossible typing speeds, session identifier discontinuities, or device fingerprint mutations trigger trust score penalties proportional to the severity and frequency of anomalies detected.

Session integrity and forensic immutability are ensured through the chain-of-custody module 340 implementing an integrity-focused data architecture. The audit log generator 342 records each behavioral authorship scoring outcome in an append-only data structure utilizing cryptographic hash chains where each entry contains a SHA-256 hash of the previous entry, creating a tamper-evident sequence. The DAG constructor 344 builds directed acyclic graph structures linking scoring events temporally and causally, where each node represents a scoring decision and edges encode dependencies between behavioral observations and score computations. This graph structure resists tampering as any modification breaks multiple hash linkages, making forensic detection of alterations computationally straightforward. The session recorder 346 optionally employs asymmetric cryptographic signatures using ECDSA with secp256k1 curves to sign critical scoring outcomes, enabling third-party verification without revealing private keys. The legal compliance formatter 348 structures these integrity-preserved records according to evidentiary standards, including ISO 27037 guidelines for digital evidence handling and NIST SP 800-86 recommendations for forensic data collection. This architecture supports evidentiary authorship validation in legal proceedings while permitting flexible implementation through configurable cryptographic algorithm selection, signature requirement policies, and retention period specifications stored in the policy repository 328.

The system 100 incorporates modular system elements addressing specific behavioral detection requirements. The sentence progression mapping module 210 provides sentence progression mapping capabilities through the intermediate state capturer 214 and sentence evolution vector generator 216, tracking how sentences evolve from initial concepts through multiple revisions to final form. The paste event detector 234 within the multi-modal input analysis module 230 implements paste behavior scoring by analyzing temporal patterns surrounding clipboard operations, computing trust penalties for excessive paste frequencies, and detecting behavioral inconsistencies between pasted and typed content. The visual authorship verification module 250 enables visual authorship verification through comprehensive biometric monitoring including gaze trajectory analysis by the biometric data receiver 252 capturing eye movement patterns during composition, blink rate monitoring detecting stress-induced variations from baseline rates, and pupil dilation measurement via the biometric sensors 118 indicating cognitive load fluctuations. The AI mimicry detection module 260 provides AI mimicry and hybrid formatting detection through the GPT-style pattern identifier 262 maintaining updated libraries of AI-characteristic patterns, and the hybrid zone detector 264 identifying document sections exhibiting behavioral transitions between human and AI authorship patterns. These modular elements operate independently yet contribute collectively to the authorship scoring engine 320, enabling selective deployment based on available sensors and verification requirements while maintaining system coherence through the event bus 202 architecture.

The system 100 optionally incorporates a public authorship registry and longitudinal scoring mechanism through extended functionality of the database system 136 and authorship scoring engine 320. A public authorship registry module (implemented within the database system 136) receives verified human-authored documents from the authorship scoring engine 320 when trust scores exceed publication thresholds defined in the policy repository 328. The registry module records document hashes using SHA-256, timestamps using NTP-synchronized clocks accurate to milliseconds, and stores documents with associated behavioral scoring outcomes in a publicly-queryable interface accessible through the REST APIs 390. The registry implements blockchain-inspired immutability through the DAG constructor 344, creating tamper-evident chains of published documents linked by cryptographic hashes. The longitudinal scorer 358 within the re-authorship detection module 350 computes persistent behavioral authorship scores across multiple submissions by tracking behavioral consistency over time periods spanning weeks to years. This longitudinal score reflects both consistency patterns, measured through statistical stability of behavioral features across sessions, and originality metrics, computed by analyzing linguistic diversity and creative expression patterns that distinguish human authors from repetitive AI systems. The temporal chain manager 324 maintains linkages between individual session scores and cumulative longitudinal scores, enabling reputation-based trust systems where authors build verifiable track records of human authorship across multiple documents and time periods. These optional components integrate seamlessly with the core behavioral verification system while providing additional value for applications requiring public accountability or long-term authorship validation.

The system, information and user flow for behavioral authorship verification depicting the operational sequence from user interaction through real-time verification decision output. There are 24 rectangular process elements, 8 diamond-shaped decision points, 3 parallelogram-shaped user interaction elements, 2 oval-shaped start/end points, and multiple database cylinder elements representing data storage operations. The elements are connected by unidirectional arrows indicating process flow, bidirectional arrows showing data exchange, and dashed lines representing asynchronous event streams. The flow initiates at a "User begins document creation" start point 401 and terminates at either a "Verification complete—Human authorship confirmed" end point 450 or a "Verification failed—AI/impostor detected" end point 452.

From the "User begins document creation" start point (401), the flow proceeds to a "Initialize behavioral monitoring" process (402) which activates the behavioral analysis orchestrator 200 on the server infrastructure 130. The initialization process (402) establishes WebSocket connections via the WebSocket interface 392 and configures event listeners on the client device 110. Simultaneously, the flow branches to a "Load user baseline" subprocess (403) that retrieves historical behavioral profiles from the baseline repository 242 within the database system 136.

The primary flow continues to a "Capture keystroke event" user interaction element (404) representing real-time input capture from the keyboard 114. Each keystroke event flows through parallel processing paths to maximize verification accuracy. The first path leads to a "Process keystroke dynamics" element (405) where the keystroke dynamics monitor 232 extracts flight time and dwell time measurements with microsecond precision. The second path flows to a "Update sentence buffer" process (406) where the sentence boundary detector 212 maintains rolling sentence state within the intermediate state capturer 214.

A "Sentence boundary detected?" decision point (407) evaluates punctuation marks and linguistic markers. If no boundary is detected (No path), the flow returns to the "Capture keystroke event" element (404) for continued monitoring. If a sentence boundary is detected (Yes path), the flow proceeds to a "Generate sentence evolution vector" process (408) where the sentence evolution vector generator 216 transforms the accumulated temporal progression patterns into multi-dimensional feature vectors.

The sentence evolution vector flows to a "Check for paste events" subprocess (409) where the paste event detector 234 analyzes the sentence construction pattern. A "Paste operation detected?" decision point (410) branches the flow. If a paste operation is detected (Yes path), the flow proceeds to an "Analyze paste context" process (411) where the input method transition analyzer 236 examines typing cadence disruptions and generates anomaly flags. If no paste operation is detected (No path), the flow continues directly to a "Calculate behavioral metrics" process (412).

The "Calculate behavioral metrics" process (412) invokes the behavioral feature extractor 218 to compute revision frequency metrics, edit distance calculations, and pause duration histograms. These metrics flow to a "Store behavioral data" operation (413) that persists timestamped behavioral events to the behavioral data store 220. Concurrently, the metrics are transmitted via the event bus 202 to a "Compare with baseline" process (414) where the deviation score calculator 246 computes Mahalanobis distance and cosine similarity measures against the user's established baseline from the baseline generator 244.

A "Biometric sensors available?" decision point (415) evaluates the presence of biometric sensors 118. If biometric sensors are available (Yes path), the flow branches to a "Capture gaze parameters" subprocess (416) where the biometric data receiver 252 samples eye movement trajectories at 120 Hz. The gaze data flows to a "Generate visual signature" process (417) where the visual event processor 254 correlates gaze timestamps with content creation events. The visual signature proceeds to a "Bind visual to behavioral" process (418) where the time-binding module 256 creates cryptographic HMAC-SHA256 associations between visual verification events and sentence progression states.

If biometric sensors are unavailable (No path from 415) or after visual binding completes (418), the flow converges at an "Analyze for AI patterns" process (419). The GPT-style pattern identifier 262 within the AI mimicry detection module 260 examines sentence structures, transition phrases, and formatting regularities against known AI-generated text patterns. The analysis results flow to a "Compute hybrid zone probability" process (420) where the hybrid zone detector 264 implements sliding window analysis across 100-500 token segments.

A "Multi-device session?" decision point (421) evaluates device transition indicators from the device transition detector 276. If multiple devices are detected (Yes path), the flow proceeds to a "Normalize cross-platform signals" process (422) where the keyboard calibrator 272 and touch input normalizer 274 apply device-specific transfer functions. The normalized signals merge with the single-device path at a "Correlate anomaly signals" process (423).

The "Correlate anomaly signals" process (423) invokes the neural correlation network 304 within the anomaly correlation module 300 to identify co-occurring anomaly patterns across behavioral dimensions. The correlation results flow to a "Weight behavioral indicators" process (424) where the weight adjustment engine 310 dynamically calibrates signal importance based on historical performance metrics from the calibration database 312.

A "Calculate authorship score" process (425) represents the score synthesizer 322 combining weighted outputs from all behavioral analysis modules 210-280. The aggregate score flows to a "Threshold evaluation" decision point (426) where the confidence threshold evaluator 326 compares the score against policy-defined thresholds from the policy repository 328.

If the score exceeds the human authorship threshold (Yes path from 426), the flow proceeds to a "Generate trust indicators" process (427) where the visual feedback generator 380 creates color-coded confidence bars and "verified human" annotations. A "Maintain trust thread" subprocess (428) updates the trust threading mechanism 382 to propagate high confidence forward. The flow then proceeds to an "Update behavioral baseline" process (429) where authenticated behavioral patterns enhance the user's baseline profile in the baseline repository 242.

If the score falls below the threshold (No path from 426), the flow branches to an "AI/impostor probability?" decision point (430). If high AI probability is detected (Yes path), the flow proceeds to a "Mark hybrid zones" process (431) where the zone boundary marker generator 266 annotates document sections with transition indicators. If impostor patterns are detected (No path from 430), the flow proceeds to a "Flag ghostwriting indicators" process (432) where the ghostwriting analyzer 356 highlights statistical divergences from the claimed author's baseline.

Both anomaly paths converge at a "Generate forensic audit trail" process (433) where the audit log generator 342 creates immutable SHA-256 hashed records of the verification failure. The audit trail flows to a "Construct custody DAG" process (434) where the DAG constructor 344 builds directed acyclic graph structures preserving temporal linkages between behavioral states.

A "Privacy settings check" decision point (435) evaluates user-configured privacy preferences from the granularity controller 366. If enhanced privacy is enabled (Yes path), the flow proceeds to an "Apply differential privacy" process (436) where the differential privacy engine 362 adds calibrated Laplacian noise to behavioral metrics before storage. If standard privacy applies (No path), the flow bypasses noise injection.

All paths converge at a "Format compliance metadata" process (437) where the legal compliance formatter 348 structures behavioral evidence according to Federal Rules of Evidence standards. The formatted data flows to a "Persist verification record" operation (438) that stores the complete verification trail in the database system 136.

A "Continue monitoring?" decision point (439) evaluates whether the user continues document creation. If monitoring continues (Yes path), the flow returns to the "Capture keystroke event" element (404) via a feedback loop (440) that maintains session state. If monitoring ends (No path), the flow proceeds to a "Generate final report" process (441) that compiles comprehensive authorship verification results.

The system includes several asynchronous background processes connected via dashed lines to the main flow. A "Real-time API stream" process (442) continuously publishes behavioral events through the REST APIs 390 for third-party integration. A "Load balancer distribution" process (443) managed by the load balancer 394 ensures sub-100 ms response times by distributing computation across multiple server instances 130. A "Continuous baseline adaptation" process (444) implements machine learning model updates based on accumulated behavioral data.

Error handling paths branch from critical decision points to an "Exception handler" process (445) that logs errors and attempts graceful recovery. A "Manual review queue" process (446) receives borderline cases where automated verification confidence falls within an ambiguous range, enabling human expert review of behavioral patterns.

The flow terminates at one of two end points based on the verification outcome. Successfully verified human authorship flows to the "Verification complete—Human authorship confirmed" end point (450), while detected AI-generated or impostor content flows to the "Verification failed—AI/impostor detected" end point (452). Both end points trigger final user interface updates via the user interface 112, displaying verification status and maintaining forensic-grade evidence suitable for legal proceedings regarding document authenticity.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A behavioral authorship verification system comprising:
   a. a processor configured to execute a plurality of behavioral analysis modules;
   b. a sentence progression mapping module configured to:
      i. detect sentence boundaries using punctuation and linguistic markers,
      ii. capture intermediate sentence states during composition including additions, deletions, and modifications,
      iii. generate sentence evolution vectors representing temporal progression patterns, and
      iv. extract behavioral features including revision frequency, edit distances, and pause durations between modifications;
   c. a multi-modal input analysis module configured to:
      i. monitor keystroke dynamics including flight time between consecutive keystrokes and dwell time on individual keys,
      ii. detect paste events and analyze surrounding behavioral context including typing cadence disruptions and correction patterns,
      iii. identify input method transitions between keyboard, paste, and other input modalities;
      iv. a behavioral pattern recognition engine configured to:
      v. generate user-specific behavioral baselines from historical authorship sessions,
      vi. compute deviation scores between current behavioral patterns and established baselines using statistical distance metrics,
      vii. detect anomalous patterns indicative of non-human or impostor authorship;
   d. an anomaly correlation module configured to:
      i. aggregate multiple behavioral deviation signals using weighted fusion algorithms,
      ii. apply compound anomaly detection wherein combinations of minor deviations trigger escalated risk scores,
      iii. generate time-windowed behavioral consistency metrics; and
   e. an authorship scoring engine configured to:
      i. synthesize outputs from the behavioral analysis modules into a unified authorship confidence score,
      ii. maintain temporal authorship chains linking behavioral patterns across document sections,
      iii. output real-time authorship verification decisions based on configurable confidence thresholds.

2. The behavioral authorship verification system of claim 1, further comprising:
   a. a visual authorship verification module including:
      i. biometric sensors configured to capture gaze behavior parameters including eye movement trajectories, blink rate patterns, pupil dilation measurements, and focus duration metrics,
      ii. a visual event processor configured to correlate captured gaze behavior with content creation timestamps to generate human witnessing signatures,
      iii. a time-binding module configured to cryptographically associate visual verification events with corresponding sentence progression states; and
      iv. wherein the authorship scoring engine is further configured to integrate visual verification signals with behavioral deviation scores to distinguish human-witnessed content creation from automated or synthetic content generation.

3. The behavioral authorship verification system of claim 1, further comprising:
   a. an AI mimicry detection module configured to:
      i. identify GPT-style phrasing patterns through analysis of sentence structure templates, transition phrase frequencies, and formatting regularities,
      ii. detect hybrid authorship zones by computing intra-document behavioral fingerprint inconsistencies using sliding window analysis with overlapping segments of 100-500 tokens,
      iii. generate zone boundary markers indicating transitions between human-authored and AI-generated content sections; and
      iv. wherein the anomaly correlation module is further configured to apply differential weighting to AI mimicry signals based on contextual confidence derived from surrounding behavioral patterns.

4. The behavioral authorship verification system of claim 1, wherein:
   a. each behavioral analysis module generates forensic-grade metadata including millisecond-precision timestamps, session identifiers, and device fingerprints;
   b. the system further comprises a chain-of-custody module configured to:
      i. create immutable audit logs using cryptographic hashing of behavioral event sequences,
      ii. implement a directed acyclic graph structure linking behavioral states across temporal progression,
      iii. generate replayable behavioral session records enabling post-hoc verification and dispute resolution; and
      iv. wherein the metadata is structured to meet legal authentication standards for evidentiary admissibility.

5. The behavioral authorship verification system of claim 1, further comprising:
   a. a cross-platform behavioral normalization engine configured to:
      i. calibrate keystroke dynamics across different keyboard types using device-specific transfer functions,
      ii. normalize touch-based input patterns from mobile devices to keyboard-equivalent behavioral metrics,
      iii. detect and flag behavioral drift patterns when users transition between devices mid-session;
      iv. a device fingerprinting module configured to maintain device-specific behavioral baselines; and
      v. wherein the behavioral pattern recognition engine applies device-aware threshold adjustments to maintain consistent authorship verification accuracy across heterogeneous input environments.

6. The behavioral authorship verification system of claim 1, wherein:
   a. the sentence progression mapping module is further configured to:
      i. detect cognitive hesitation patterns through analysis of micro-pauses between keystrokes ranging from 50 ms to 5000 ms,
      ii. identify thinking-in-progress indicators including partial word typing followed by deletion sequences,
      iii. compute cognitive load metrics based on revision complexity and temporal distribution of edits;
      iv. the behavioral pattern recognition engine incorporates a cognitive rhythm model trained on labeled datasets distinguishing natural human hesitation from programmatic delays; and
      v. wherein anomalous cognitive patterns including unnaturally consistent typing speeds or absence of characteristic human hesitation trigger elevated risk scores.

7. The behavioral authorship verification system of claim 1, wherein the anomaly correlation module implements:
   a. a multi-tier fusion architecture comprising:
      i. first-tier signal normalization using z-score standardization for each behavioral metric,
      ii. second-tier feature correlation using a trained neural network with attention mechanisms to identify co-occurring anomaly patterns,
      iii. third-tier temporal correlation examining behavioral consistency across sliding time windows of 30-300 seconds;
      iv. a compound anomaly trigger engine wherein combinations of three or more minor behavioral deviations, each individually below alert thresholds, generate escalated authentication challenges; and
      v. dynamic weight adjustment based on historical false positive and false negative rates for each behavioral signal type.

8. The behavioral authorship verification system of claim 1, further comprising:
   a. a re-authorship detection module configured to:
      i. maintain versioned behavioral templates for each document section,
      ii. detect rewrite attempts through comparison of current behavioral patterns against historical templates using dynamic time warping algorithms,
      iii. identify potential ghostwriting by analyzing statistical divergence between claimed author baselines and observed behavioral patterns;
      iv. a longitudinal scoring engine configured to track authorship consistency across multiple sessions spanning days to months; and
      v. wherein detection of re-authorship patterns triggers enhanced verification requirements including biometric re-authentication.

9. The behavioral authorship verification system of claim 1, wherein:
   a. the authorship scoring engine provides real-time visual feedback through:
   b. color-coded confidence indicators updated at sentence completion boundaries,
   c. trust level annotations ranging from "verified human" to "high AI probability" with intermediate gradations,
   d. behavioral anomaly highlighting identifying specific suspicious patterns;

e. the system implements a trust threading mechanism that:
f. maintains running behavioral consistency scores across document sections,
g. propagates trust degradation forward when anomalies are detected,
h. requires behavioral re-establishment after trust score drops below configurable thresholds; and
i. wherein the visual feedback mechanism operates without interrupting natural writing flow.

10. The behavioral authorship verification system of claim 1, further comprising:
   a. a privacy preservation module configured to:
      i. implement differential privacy mechanisms adding calibrated noise to behavioral metrics while maintaining verification accuracy,
      ii. generate anonymized behavioral templates using secure multi-party computation protocols,
      iii. provide user-controlled granularity settings for behavioral data retention ranging from session-only to permanent storage;
      iv. wherein the behavioral pattern recognition engine operates on privacy-preserved features without access to raw keystroke or revision data; and
      v. wherein users maintain sovereign control over behavioral template deletion and cross-session correlation permissions.

11. The behavioral authorship verification system of claim 1, wherein:
   a. the system is configured to operate with one or more input modalities including but not limited to keystroke input, paste input, gaze data, voice signals, neural signals, stylometric features, or metadata-derived signals; and
   b. the authorship scoring engine is further configured to generate valid authorship confidence scores regardless of which specific input modalities are available during a verification session.

12. The behavioral authorship verification system of claim 1, further comprising:
   a. neural input processing capabilities configured to:
      i. receive neural signals derived from brain-computer interfaces, thought-to-text translators, neural prosthetic devices, electroencephalography (EEG) sensors, or functional near-infrared spectroscopy (fNIRS) devices,
      ii. extract behaviorally-relevant neural patterns through adaptive filtering algorithms,
      iii. identify cognitive effort signatures associated with sentence formulation, word selection deliberation, and creative ideation phases, and
      iv. establish tamper-evident chains linking neural activity bursts with corresponding text generation events; and
   b. wherein the authorship scoring engine is further configured to incorporate neural signal fluctuations as additional behavioral dimensions when synthesizing comprehensive trust scores.

13. The behavioral authorship verification system of claim 1, wherein:
   a. the behavioral pattern recognition engine is further configured to:
      i. operate in a baseline-available mode that computes statistical distances between current behavioral observations and user-specific templates stored in a baseline repository,
      ii. operate in a baseline-absent mode that performs absolute behavioral analysis by comparing observed patterns against population-wide human behavioral norms rather than individual baselines, and
      iii. automatically detect baseline availability and route processing accordingly; and
   b. wherein the authorship scoring engine is configured to generate valid trust scores regardless of baseline presence, supporting both anonymous verification scenarios and personalized authorship validation use cases.

14. The behavioral authorship verification system of claim 1, wherein the sentence progression mapping module implements a seven-layer stylometric analysis system comprising:
   a. sentence variation analysis computing sentence length distributions, syntactic complexity metrics, and clause nesting patterns;
   b. vocabulary entropy measurement through real-time tracking of word frequency distributions, hapax legomena ratios, and type-token ratios;
   c. phrase reuse detection maintaining a rolling cache of n-gram sequences and identifying repetition patterns;
   d. punctuation rhythm analysis through inter-punctuation timing intervals, punctuation type sequences, and rhythmic patterns in punctuation usage;
   e. passive voice presence detection through linguistic analysis identifying past participle constructions and auxiliary verb patterns;
   f. sentence progression pattern mapping tracking evolutionary paths from initial fragments to completed thoughts; and
   g. structural consistency evaluation through document-wide analysis of paragraph lengths, heading patterns, and organizational coherence metrics.

15. The behavioral authorship verification system of claim 1, further comprising:
   a. a public authorship registry module configured to:
      i. receive verified human-authored documents when trust scores exceed publication thresholds,
      ii. record document hashes, timestamps, and associated behavioral scoring outcomes in a publicly-queryable interface,
      iii. implement blockchain-inspired immutability through cryptographic hash chains creating tamper-evident links between published documents; and
   b. wherein the system provides verification interfaces enabling third parties to validate document authorship claims through cryptographically secured behavioral evidence.

16. The behavioral authorship verification system of claim 1, further comprising:
   a. a longitudinal scoring engine configured to:
      i. compute persistent behavioral authorship scores across multiple submissions by tracking behavioral consistency over time periods spanning weeks to years,
      ii. analyze both consistency patterns measured through statistical stability of behavioral features across sessions and originality metrics computed through linguistic diversity analysis,
      iii. maintain linkages between individual session scores and cumulative longitudinal scores enabling reputation-based trust assessment; and
   b. wherein the longitudinal scoring engine enables verification systems to distinguish between established human authors with consistent behavioral patterns and automated systems attempting to mimic human behavior.

17. The behavioral authorship verification system of claim 1, further comprising:
   a. a voice analysis module configured to:
      i. process voice inputs captured during content creation sessions,
      ii. extract vocal biomarkers including pitch variations, speaking rate fluctuations, and phonetic emphasis patterns characteristic of individual speaking styles,
      iii. correlate voice-derived behavioral signals with concurrent text generation events creating multimodal verification linkages; and
   b. wherein the authorship scoring engine is further configured to incorporate voice-derived behavioral dimensions into trust score synthesis when voice input modalities are available.

18. The behavioral authorship verification system of claim 1, wherein:
   a. the system implements human origin verification through a multi-layered validation architecture that:
      i. analyzes behavioral signal consistency across multiple physiological and cognitive dimensions that cannot be simultaneously faked by automated systems,
      ii. verifies biological presence through detection of micro-timing variations caused by neuromuscular control loops operating at frequencies characteristic of human motor control,
      iii. confirms physical presence through detection of involuntary eye movements, spontaneous blink patterns, and saccadic movements during reading, and
      iv. examines cross-modal consistency ensuring keystroke dynamics align temporally with gaze patterns and neural signals when available; and
   b. wherein the authorship scoring engine grants human origin verification only when behavioral signal consistency exceeds predetermined thresholds across at least three independent biological channels, preventing spoofing through any single faked signal while maintaining usability when some sensors are unavailable.

19. A computer-implemented method for verifying authorship through sentence progression behavioral analysis, comprising:
   a. capturing, by a sentence progression tracker, character-level input events during document composition;
   b. detecting, by a sentence boundary analyzer, sentence completion events based on terminal punctuation and grammatical structure;
   c. generating, for each detected sentence, a progression fingerprint comprising:
      i. a temporal sequence of sentence states from initial character to final form,
      ii. edit operation vectors encoding insertion, deletion, and substitution patterns,
      iii. pause duration distributions between consecutive edit operations, and
      iv. cognitive flow indicators derived from revision patterns and semantic drift;
   d. extracting behavioral features from the progression fingerprint including:
      i. sentence construction velocity calculated as characters per unit time with pause normalization,
      ii. revision depth metrics quantifying the semantic distance between sentence versions,
      iii. hesitation patterns identified through abnormal pause clustering, and
      iv. commitment indicators based on finalization behaviors;
   e. comparing the extracted behavioral features against a stored authorship profile using machine learning classifiers trained on verified authorship samples;
   f. correlating the sentence-level behavioral analysis with auxiliary signals including:
      i. keystroke dynamics deviations from baseline typing patterns,
      ii. paste behavior anomalies indicating external content injection, and
      iii. cross-sentence consistency metrics evaluating stylistic continuity;
   g. computing a dynamic authorship confidence score by:
   h. applying time-decay weighting to behavioral signals based on recency,
   i. adjusting confidence thresholds based on document criticality and security context, and
   j. incorporating longitudinal drift compensation for evolving user behaviors; and
   k. generating an authorship verification decision with associated metadata including behavioral replay data, confidence intervals, and anomaly flags for forensic review.

20. The computer-implemented method of claim 19, further comprising:
   a. capturing, by biometric sensors, gaze behavior parameters including eye movement trajectories, blink rate patterns, pupil dilation measurements, and focus duration metrics during the document composition;
   b. correlating, by a visual event processor, the captured gaze behavior with content creation timestamps to generate human witnessing signatures;
   c. cryptographically binding the human witnessing signatures to corresponding sentence states within the temporal sequence; and
   d. wherein the computing of the dynamic authorship confidence score further incorporates visual verification signals to distinguish human-witnessed content creation from automated or synthetic content generation.

21. The computer-implemented method of claim 19, further comprising:
   a. analyzing the generated progression fingerprints to identify GPT-style phrasing patterns through detection of sentence structure templates, transition phrase frequencies, and formatting regularities;
   b. detecting hybrid authorship zones by:
      i. computing intra-document behavioral fingerprint inconsistencies using sliding window analysis with overlapping segments of 100-500 tokens,
      ii. generating zone boundary markers indicating transitions between human-authored and AI-generated content sections, and
      iii. calculating confidence degradation at identified zone boundaries;
      iv. wherein the correlating step applies differential weighting to detected AI mimicry signals based on contextual confidence derived from surrounding behavioral patterns.

22. The computer-implemented method of claim 19, wherein:
   a. the capturing step generates forensic-grade metadata including millisecond-precision timestamps, session identifiers, and device fingerprints for each character-level input event;
   b. the method further comprises creating an immutable chain-of-custody by:
      i. cryptographically hashing behavioral event sequences,
      ii. constructing a directed acyclic graph structure linking behavioral states across temporal progression, and
      iii. generating replayable behavioral session records enabling post-hoc verification and dispute resolution; and
      iv. wherein the generated metadata is structured to meet legal authentication standards for evidentiary admissibility.

23. The computer-implemented method of claim 19, further comprising:
   a. normalizing the captured character-level input events across different device types by:
      i. calibrating keystroke dynamics using device-specific transfer functions for different keyboard types,
      ii. converting touch-based input patterns from mobile devices to keyboard-equivalent behavioral metrics, and
      iii. detecting behavioral drift patterns when users transition between devices mid-session;
      iv. maintaining device-specific behavioral baselines within the stored authorship profile; and
      v. wherein the comparing step applies device-aware threshold adjustments to maintain consistent authorship verification accuracy across heterogeneous input environments.

24. The computer-implemented method of claim 19, wherein:
   a. the cognitive flow indicators are derived by:
      i. detecting cognitive hesitation patterns through analysis of micro-pauses between keystrokes ranging from 50 ms to 5000 ms,
      ii. identifying thinking-in-progress indicators including partial word typing followed by deletion sequences, and
      iii. computing cognitive load metrics based on revision complexity and temporal distribution of edits;
      iv. the comparing step employs a cognitive rhythm model trained on labeled datasets distinguishing natural human hesitation from programmatic delays; and
      v. wherein detection of anomalous cognitive patterns including unnaturally consistent typing speeds or absence of characteristic human hesitation triggers elevated anomaly flags.

25. The computer-implemented method of claim 19, wherein the correlating step implements multi-tier fusion comprising:
   a. performing first-tier signal normalization using z-score standardization for each behavioral metric;
   b. executing second-tier feature correlation using a trained neural network with attention mechanisms to identify co-occurring anomaly patterns;
   c. applying third-tier temporal correlation examining behavioral consistency across sliding time windows of 30-300 seconds;
   d. triggering compound anomaly detection wherein combinations of three or more minor behavioral deviations, each individually below alert thresholds, generate escalated authentication challenges; and
   e. dynamically adjusting correlation weights based on historical false positive and false negative rates for each behavioral signal type.

26. The computer-implemented method of claim 19, further comprising:
   a. maintaining versioned behavioral templates for each document section within the stored authorship profile;
   b. detecting rewrite attempts by:
      i. comparing current progression fingerprints against historical behavioral templates using dynamic time warping algorithms,
      ii. computing statistical divergence between claimed author baselines and observed behavioral patterns, and
      iii. identifying potential ghostwriting through anomalous pattern clustering;
      iv. tracking authorship consistency across multiple sessions spanning days to months using longitudinal scoring; and
   c. wherein detection of re-authorship patterns triggers enhanced verification requirements including biometric re-authentication.

27. The computer-implemented method of claim 19, wherein:
   a. the generating step provides real-time visual feedback comprising:
      i. color-coded confidence indicators updated at each sentence completion event,
      ii. trust level annotations ranging from "verified human" to "high AI probability" with intermediate gradations, and
      iii. behavioral anomaly highlighting identifying specific suspicious patterns within the progression fingerprint;
      iv. the method implements trust threading by:
      v. maintaining running behavioral consistency scores across document sections,
      vi. propagating trust degradation forward when anomalies are detected in the correlation step, and
      vii. requiring behavioral re-establishment after the authorship confidence score drops below configurable thresholds; and
   b. wherein the visual feedback operates without interrupting natural writing flow during document composition.

28. The computer-implemented method of claim 19, further comprising:
   a. implementing privacy preservation during the behavioral feature extraction by:
      i. applying differential privacy mechanisms adding calibrated noise to behavioral metrics while maintaining verification accuracy,
      ii. generating anonymized behavioral templates using secure multi-party computation protocols, and
      iii. providing user-controlled granularity settings for behavioral data retention ranging from session-only to permanent storage;
      iv. wherein the comparing step operates on privacy-preserved features without accessing raw keystroke or revision data; and
      v. wherein users maintain sovereign control over behavioral template deletion and cross-session correlation permissions through explicit consent mechanisms.

* * * * *